Sept. 11, 1951 G. J. SIEZEN 2,567,654

SCREEN FOR TELEVISION PROJECTION

Filed July 29, 1948 10 Sheets-Sheet 1

GERRIT JAN SIEZEN
INVENTOR

BY [signature]
AGENT

Sept. 11, 1951 G. J. SIEZEN 2,567,654

SCREEN FOR TELEVISION PROJECTION

Filed July 29, 1948 10 Sheets-Sheet 2

GERRIT JAN SIEZEN
INVENTOR

BY Fred M Vogel
AGENT

GERRIT JAN SIEZEN
INVENTOR
BY Fred M Vogel
AGENT

Sept. 11, 1951 G. J. SIEZEN 2,567,654

SCREEN FOR TELEVISION PROJECTION

Filed July 29, 1948 10 Sheets-Sheet 4

GERRIT JAN SIEZEN
INVENTOR

BY Fred M Vogel
AGENT

SCREEN FOR TELEVISION PROJECTION

GERRIT JAN SIEZEN
INVENTOR
BY [signature]
AGENT

Sept. 11, 1951 G. J. SIEZEN 2,567,654

SCREEN FOR TELEVISION PROJECTION

Filed July 29, 1948 10 Sheets-Sheet 6

GERRIT JAN SIEZEN
INVENTOR
BY Fred M Vogel
AGENT

GERRIT JAN SIEZEN
INVENTOR
BY Fred M Vogel
AGENT

GERRIT JAN SIEZEN
INVENTOR
BY Fred M Vogel
AGENT

Sept. 11, 1951 G. J. SIEZEN 2,567,654

SCREEN FOR TELEVISION PROJECTION

Filed July 29, 1948 10 Sheets-Sheet 9

GERRIT JAN SIEZEN
INVENTOR
BY Fred M Vogel
AGENT

Sept. 11, 1951 G. J. SIEZEN 2,567,654

SCREEN FOR TELEVISION PROJECTION

Filed July 29, 1948 10 Sheets-Sheet 10

GERRIT JAN SIEZEN
INVENTOR
BY Fred M Vogel
AGENT

Patented Sept. 11, 1951

2,567,654

UNITED STATES PATENT OFFICE 2,567,654

SCREEN FOR TELEVISION PROJECTION

Gerrit Jan Siezen, Eindhoven, Netherlands, assignor to Hartford National Bank and Trust Company, Hartford, Conn., as trustee Application July 29, 1948, Serial No. 41,361
In the Netherlands August 21, 1947

2 Claims. (Cl. 88—28.93)

This invention relates to a projection device having an area of image in which at least one raster of equidistant straight lines coincides with at least one raster of equidistant circular lines, more particularly a television receiver.

Applicant has found that with such projection devices circumstances may occur due to which anomalies appear in the image. Before describing the steps taken for avoiding the defects, these circumstances will be discussed with reference to the accompanying drawings, given by way of example.

Figs. 5 to 16 are diagrams illustrating the formation of moiré figures at different values of the ratic $a$.

Figure 1:
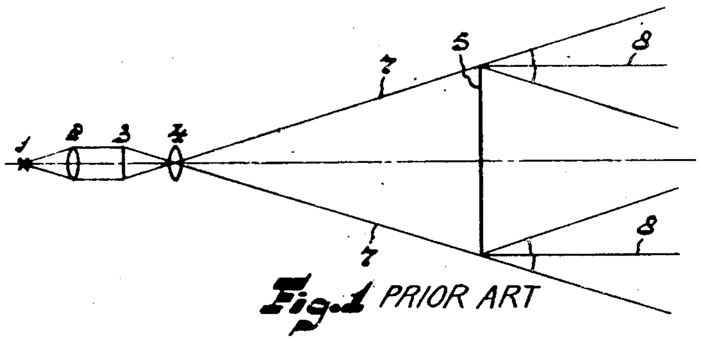
Fig. 1 PRIOR ART
Fig. 1 is a diagrammatic section of a known projection device, for example a film projector.

The projection device comprises a source of light 1, a condenser 2, an object to be projected, for instance a film 3 and an object glass 4. The image is cast on a screen 5, in the present case a translucent screen.

Figure 2:
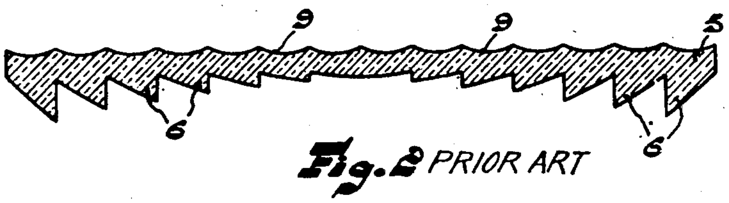
Fig. 2 PRIOR ART
Fig. 2 is a section on enlarged scale of a known projection screen to be used with such a projection device.

At one side of such screens a so-called Fresnel surface is often formed i. e. provided with a raster or prismatic grooves with a gradually varying profilation, in the form of circles or an Archimedean spiral conferring the reflecting properties of a lens on the flat screen. In Fig. 2 these ribs are designated 6. Due to this Fresnel surface the light rays, for instance the rays 7, falling on the screen at the edge are diffused in a spatial angle of which the axes 8 are no longer in line with the rays 7, but of which these axes are bent together. As a result thereof the screen appears brighter to the observer.

It is not vital to the invention whether the circular lines forming the Fresnel surface are pure circles or form an Archimedean spiral.

It is known to provide the screen at the other side with a raster of straight grooves 9, sometimes two of such crossed rasters, in order to direct the light radiated by the screen, which would be lost in the auditorium far above and below the screen, more into the direction of the audience. By these means it is ensured that the space from which the image is clearly visible, becomes comparatively broad and low.

In the drawing the ribs 6 and the grooves 9 are greatly exaggerated. They are chosen to be so narrow as to be imperceptible when viewed at some distance from the screen. The width may, for instance, be of the order of 0.5 mm.

Figure 3:
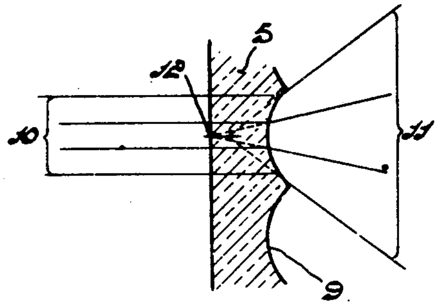
Fig. 3 PRIOR ART
Fig. 3 illustrates the path of a light beam through such a screen.

If an image is cast on such a screen the latter will not blink evenly. The raster of straight grooves exhibits alternating bright and dark lines, since, as appears from Fig. 3, a beam of parallel incident light rays 10 is so refracted as to form a diverging beam 11 and a vertual image 12. Since the groove is straight this image exhibits the form of a narrow band, the space between two bands being dark.

The Fresnel surface also exhibits dark lines due to the inactive parts constituting the transition of one rib into the other.

These lines exhibit the form of circles or of an Archimedean spiral. As has been pointed out, however, the grooves and ribs are too narrow so that the dark and bright lines also are so crowded that they are not troublesome in viewing the image projected.

Such a raster of straight lines is formed in a television image. The drawing does not represent a television receiver, but the path of the light rays therein appears from Fig. 1, if the source of light 1, the condenser 2 and the film 3 are replaced by a cathode beam tube of which the screen is located at 3.

Applicant has found that if a raster of straight lines coincides with a raster of circles (or with a raster in the form of an Archimedean spiral which, owing to the small relative spacing of the lines, makes no difference in the present case) anomalies do occur in the image. These exhibit the form of definite figures, so-called moiré figures, which are formed by lines that are much more spaced apart from each other than those of the circle raster or line raster.

Figure 4:
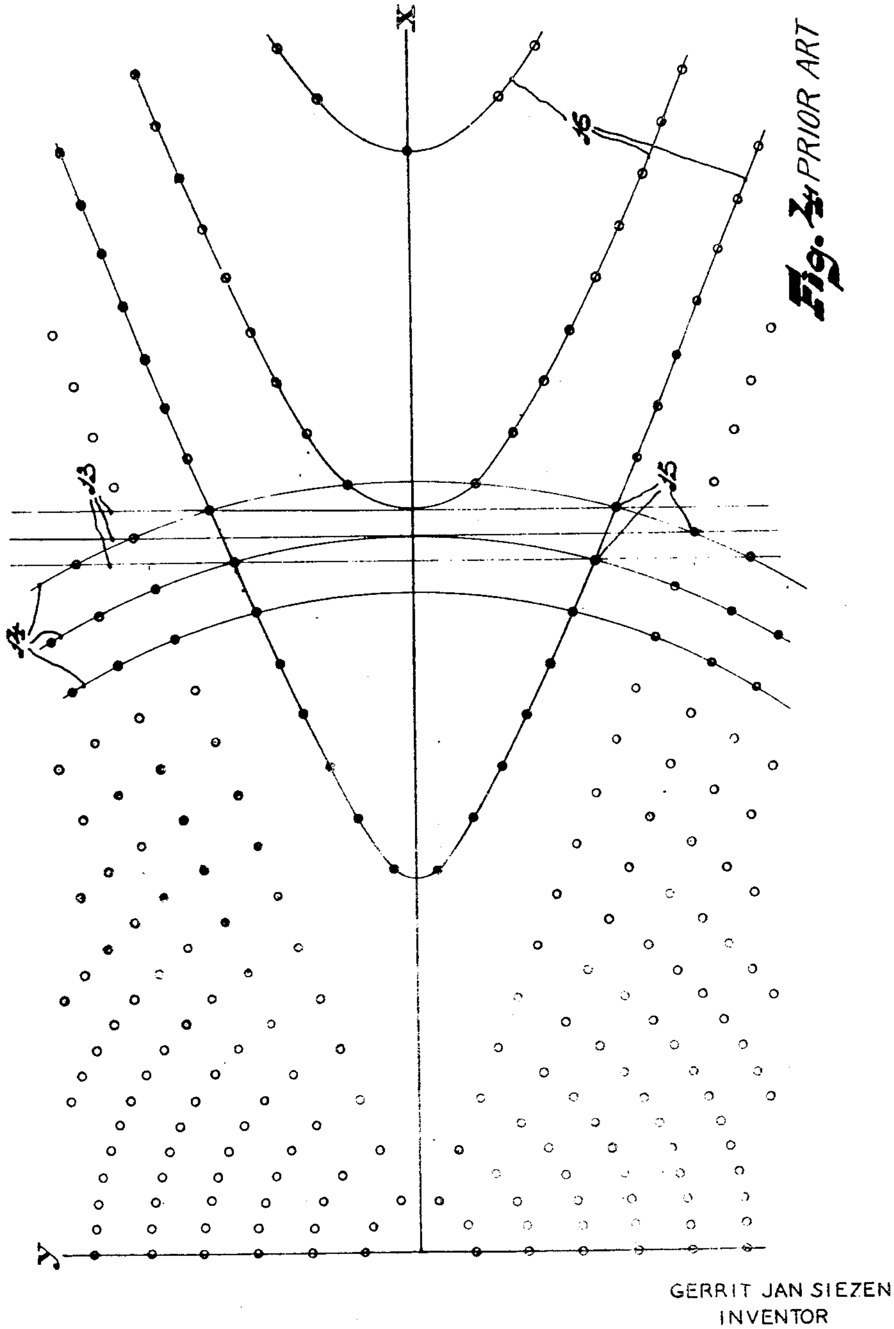
Fig. 4 PRIOR ART
Fig. 4 illustrates the anomalies which may occur on such a screen.

Fig. 4 illustrates how these moiré figures may be formed. It has been assumed that a raster having dark straight parallel lines 13 (of which only three are shown) coincides with another raster of equidistant dark circles 14 of which also only a few are shown. At the points of intersection of the dark lines, dark points or patches 15 are observed.

Owing to the small relative spacing of the lines the initial rasters are not perceived by the eye, but the eye arranges dark points involuntarily into lines which may be spaced much more widely apart, so that they may be annoying. Three of these lines are shown in the drawing and designated 16. It is clearly visible that the relative spacing of these lines 16 considerably exceeds the spacing of the lines of the initial rasters and furthermore that the spacing is a maximum where the straight lines of one raster are about tangent to the circles of the circle raster i. e. in the proximity of the X-axis. At a greater distance from the centre the moiré figures are most troublesome, since the circles extend over a greater distance substantially parallel with the straight lines, and the losses of light are a maximum at the rims of the Fresnel lens.

This invention is based on the recognition that the occurrence of troublesome moiré figures may be avoided by choosing definite ratios between the spacing of the equidistant circles and that of the equidistant straight lines. In the present case this ratio is denoted by the number $a$.

According to the invention this ratio lies between the values $$a'=\frac{1.45}{1+1.45i} \quad \text{and} \quad a''=\frac{3.25}{1+3.25i}$$

if $a$ is smaller than unity, and between $$a'=\frac{1+3.25i}{3.25} \quad \text{and} \quad a''=\frac{1+1.45i}{1.45}$$

if $a$ exceeds unity, $i$ representing a whole number and being, consequently, equal to 1, 2, 3 and so on.

The ratio is preferably chosen, however, to lie between $$a'=\frac{1.56}{1+1.56i} \quad \text{and} \quad a''=\frac{2.8}{1+2.8i}$$

if $a$ is smaller than unity and between $$a'=\frac{1+2.8i}{2.8} \quad \text{and} \quad a''=\frac{1+1.56i}{1.56}$$

if $a$ exceeds unity.

In order that the invention may be more clearly understood and readily carried into effect, it will now be described more fully with reference to the accompanying drawings and by giving a calculation.

Before proceeding to the calculation of those ratios $a$, at which the troublesome occurrence of the moiré figures is avoided, we shall first examine the nature of the lines which lead to the formation of these figures.

For this purpose we take a rectangular system of coordinates X, Y (Fig. 4) in which the circle raster is represented by $$x^2+y^2=n^2a^2 \qquad (1)$$

in which $n$ represents and arithmetical progression of whole numbers, whereas the line raster is represented by $$x=m \qquad (2)$$

in which $m$ traverses the series of natural numbers.

As may be seen from Fig. 4, the points of intersection of these rasters may be arranged in an infinite number of ways, like in a forest in which the trees have been regularly planted and in which, in accordance with the location of the observer and the direction of observation, other rows of trees are observed in every instance.

The moiré figures will be formed by the lines on which the points of intersection are arranged most conspicuously i. e. one of those for which holds $$n=pm+q \qquad (3)$$

in which $p$ and $q$ have a fixed value for each manner of arrangement and in such manner that the values of $n$ following from (3) are always whole numbers.

If the coordinates of an arbitrary point of intersection of the two rasters be $x$ and $y$, then $$x=m \qquad (4)$$

and $$\sqrt{n^2a^2-x^2}=\sqrt{n^2a^2-m^2} \qquad (5)$$

It will now be examined on which curve $(x, y)$ this point may lie, if for $n$ and $m$ all possible values are chosen, but in such manner that:

$$n=pm+q \qquad (3)$$

This curve is obtained by eliminating $n$ and $m$ from the Equations 1, 2 and 3.

It is then found that:

$$y^2=(px+q)^2a^2-x^2$$
$$=(p^2a^2-1)x^2+2pqxa^2+q^2a^2$$

from which follows:

$$x^2-\frac{2pqa^2}{1-p^2a^2}x+\frac{y^2}{1-p^2a^2}=\frac{q^2a^2}{1-p^2a^2}$$

and $$\frac{\left(x-\frac{pqa^2}{1-p^2a^2}\right)^2}{\left(\frac{qa}{1-p^2a^2}\right)^2}+\frac{y^2}{\left(\frac{qa}{\sqrt{1-p^2a^2}}\right)^2}=1 \qquad (6)$$

This equation may represent different curves. If $$1-p^2a^2>0, \quad \text{or} \quad -\frac{1}{a}<p<+\frac{1}{a} \qquad (7)$$

the curve exhibits the shape of an ellipse.

If $$1-p^2a^2<0, \quad \text{or} \quad -\frac{1}{a}>p>+\frac{1}{a} \qquad (8)$$

the Equation 6 changes into:

$$\frac{\left(x+\frac{pqa^2}{p^2a^2-1}\right)^2}{\left(\frac{qa}{p^2a^2-1}\right)^2}-\frac{y^2}{\left(\frac{qa}{\sqrt{p^2a^2-1}}\right)^2}=1$$

which represents a family of hyperbolas.

If $$1-p^2a^2=0 \text{ or } p=\text{about } \frac{1}{a} \qquad (9)$$

it is found that, if (6) be written as follows:

$$\frac{1-p^2a^2}{q^2a^2}x^2-\frac{2p}{q}x+\frac{y^2}{q^2a^2}=1 \qquad (10)$$

it changes into $$x=\frac{y^2}{2pqa^2}-\frac{q}{2p} \qquad (11)$$

which represents a family of parabolas.

If $$p=0 \qquad (12)$$

then (6) changes into $$\frac{x^2}{q^2a^2}+\frac{y^2}{q^2a^2}=1$$

and from (3) it follows that in this event $n=q$, hence $$x^2+y^2=n^2a^2$$

which equation represents the circle raster. If $$p=\pm\infty \qquad (13)$$

the Equation 10 changes, if $q$ has first been substituted by $q=n-pm$ (3) and we have:

$$\frac{(1-p^2a^2)x^2}{(n-pm)^2a^2}-\frac{2px}{n-pm}+\frac{y^2}{(n-pm)^2a^2}=1$$

into $$x^2-2mx+m^2=0$$

or $$x=m$$

this equation represents the initial raster of straight lines. It is thus found that at a given value of $a$, there is an infinite number of "ordination curves," each of which is determined by the value of $q$; the shape of the curve, however, only depends upon the number $p$.

Before proceeding to the derivation of the optimum values of $a$, with a view to preventing the formation of moiré figures, it will first be examined in general which phenomena occur with a variation of the number $a$ designating the ratio between the spacing of the circles and that of the lines.

If $$p=\text{approximately } \frac{1}{a} \qquad (9)$$

where $p$ represents a whole number or its reciprocal value, parabolas will be formed. In this case also $a$ is a whole number or its reciprocal value.

If $p$ and $a$ are caused to vary, such parabolas appear whenever $p$ and $a$ fulfil this condition.

Figure 5:
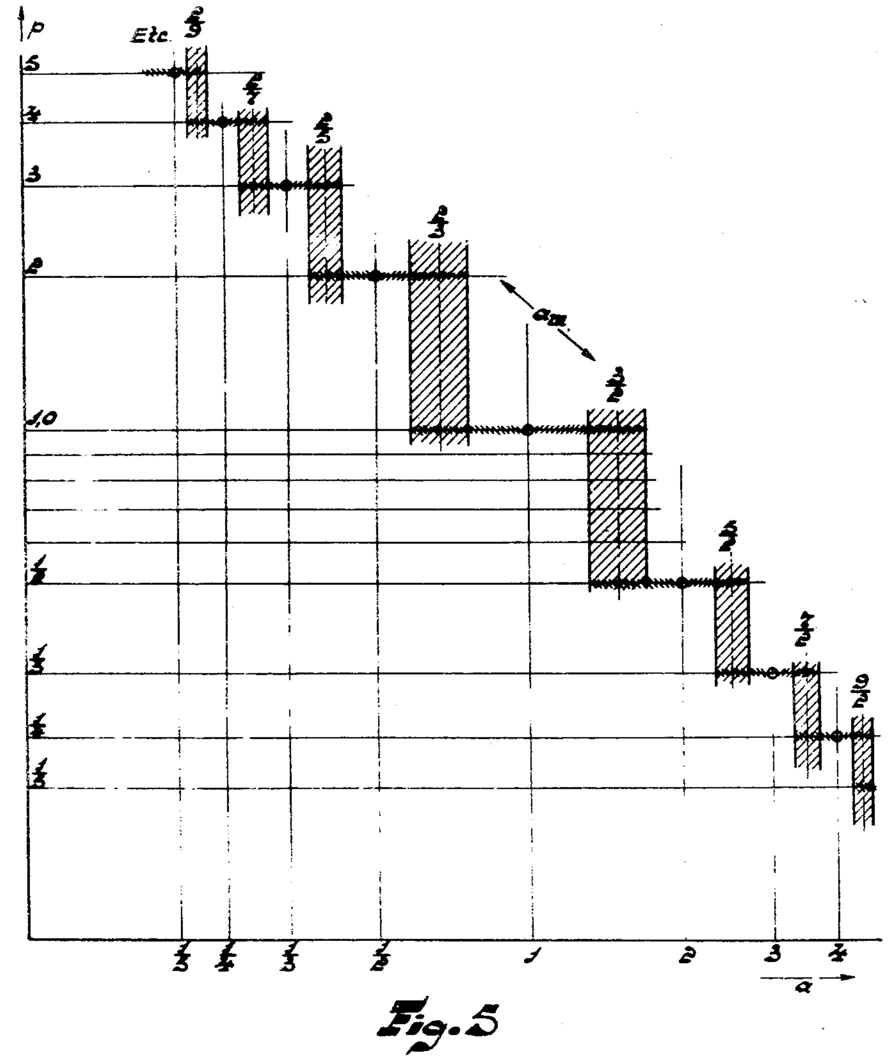
Fig. 5 is a graph on a logarithmic scale of the optimum values of the ratio $a$.

This is illustrated by means of a graph in Fig. 5, in which the values $p$ and $a$ are indicated on a logarithmic scale. A value $p=1$ is associated with $a=1$; $p=2$ is associated with $a=\frac{1}{2}$ and so forth.

Assuming $a_k$ to be one of these values of $a$ and if this value is caused to increase slightly to $a'_k$, then the value $$\frac{1}{a'_k}<p$$

which means, as appears from (8), that the ordination curves exhibit the form of hyperbolas. If the value $a_k$ is caused to decrease slightly to $a''_k$ then $$\frac{i}{a''_k}>p$$

which means that the curves exhibit the form of ellipses (cf. (7)).

This is shown in Fig. 5 by different cross-hatching; each of these points indicating a value of $a$ at which parabolas appear, is flanked on the right-hand side by a range in which hyperbolas are formed and on the left-hand side by a range in which ellipses are formed.

However, if $a$ has a value between $a_k$ and $a_{k+1}$, it may be attained by causing the value $a_k$ to increase to a value at which the parabolas initially change into hyperbolas, or by causing the value $a_{k+1}$ to decrease to a value at which the parabolas are initially seen to change into ellipses.

In the same manner $a$ may, as an alternative, have a value between $a_k$ and $a_{k-1}$, which may be attained by causing $a_k$ to decrease (when first ellipses appear) or by causing $a_{k-1}$ to increase (when first hyperbolas appear).

Figures 6 to 16 illustrate various cases. The circle and line rasters themselves are not shown in these figures. Since the moiré figures formed are symmetrical relatively to the Y-axis, only the part on the right-hand side of this axis is shown in each instance. The spots which are formed at the points of intersection of the rasters and cause the figures, are shown in the form of round dots. This is not entirely in accordance with the real shape, particularly not where the circles and the lines intersect with each other at small angles i. e. near the X-axis. The spots become considerably more elongated.

Figure 6:
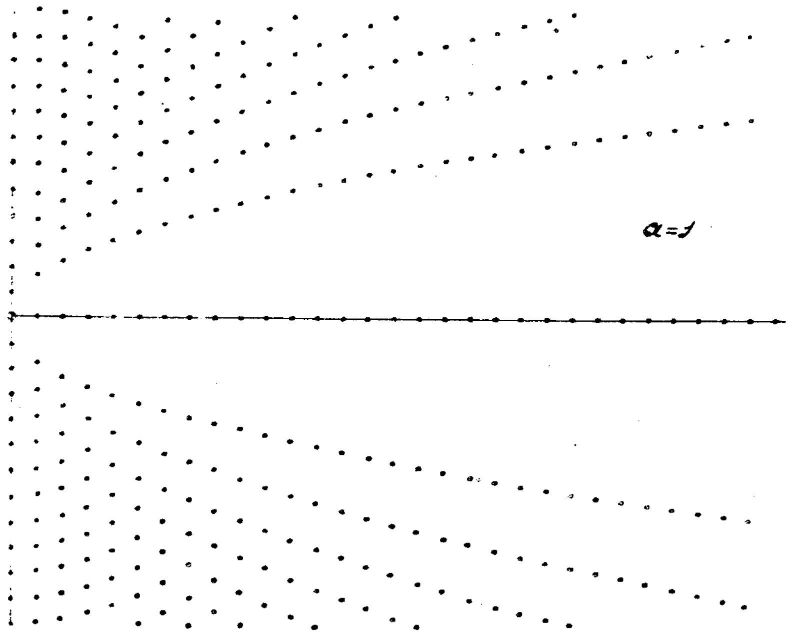

In Fig. 6 $a$ is chosen to be unity; the relative distance of the circles is equal to that of the straight lines. The parabolic form of the ordination curves is clearly visible.

Figure 7:
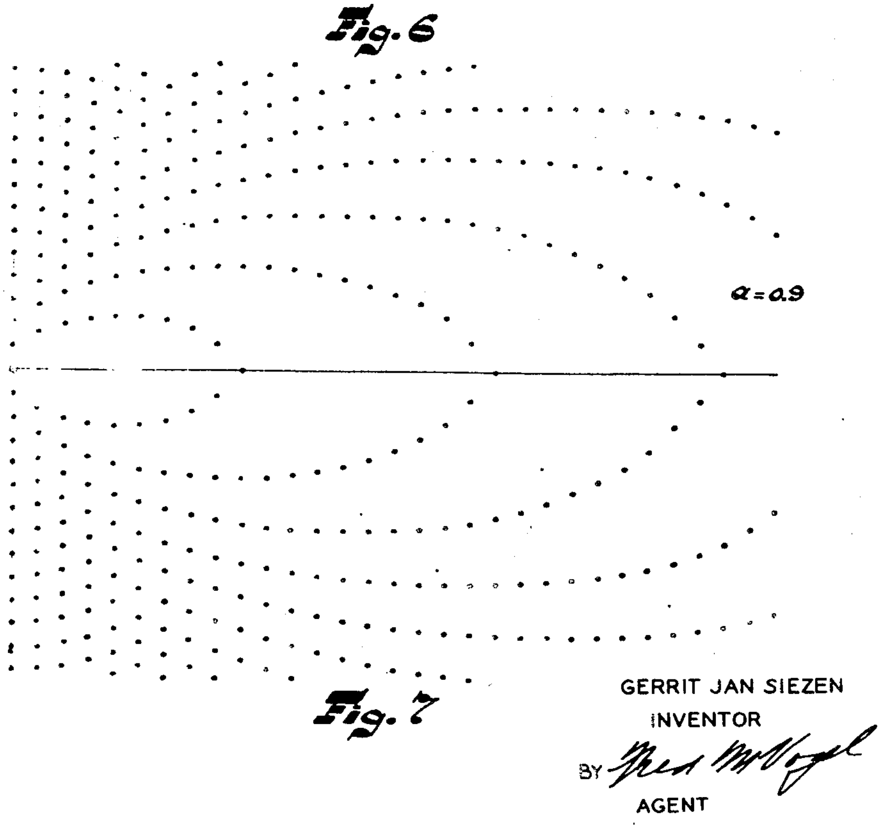
Figure 8:
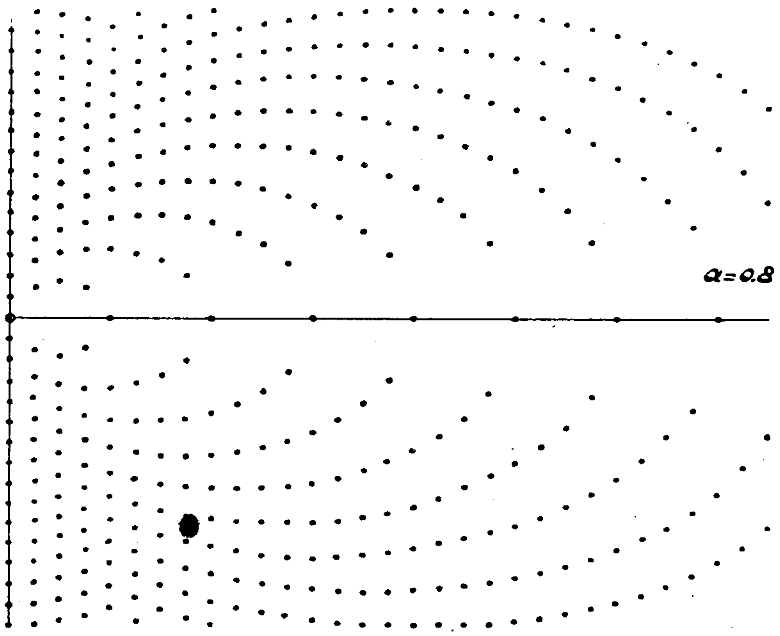
Figure 9:
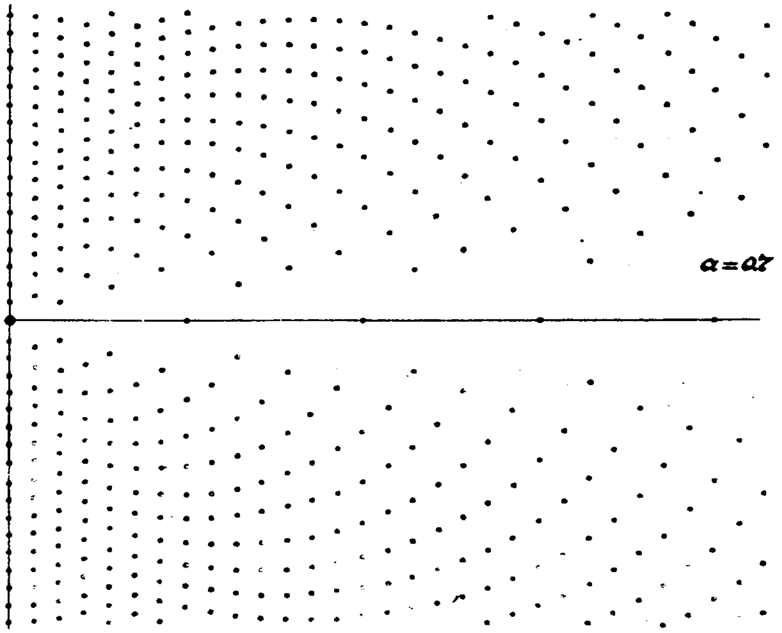
Figure 10:
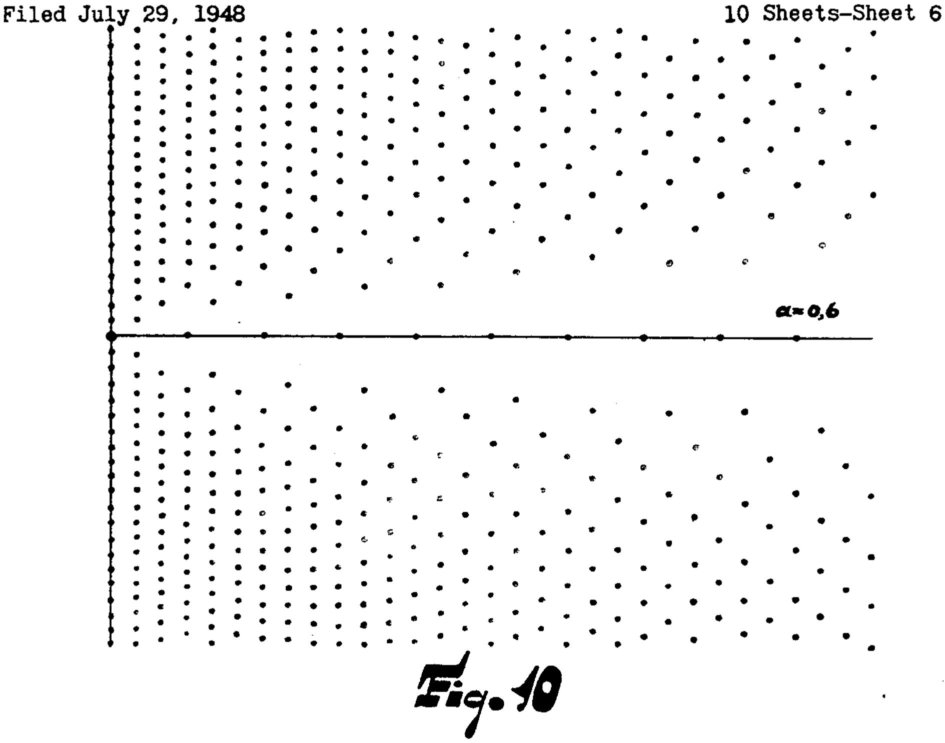
Figure 11:
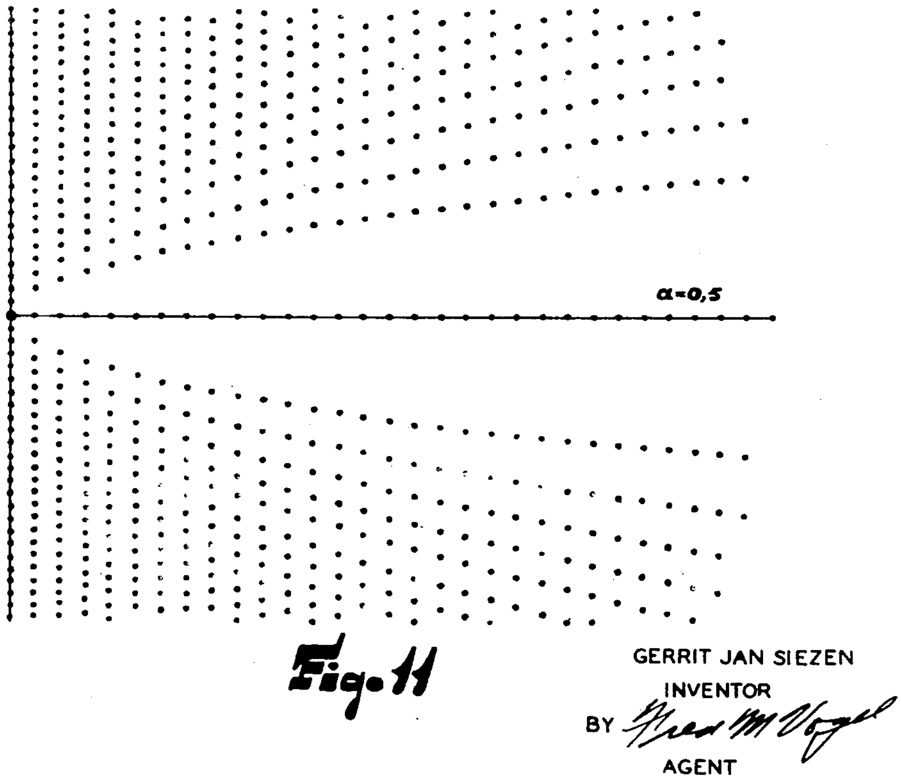
Figure 12:
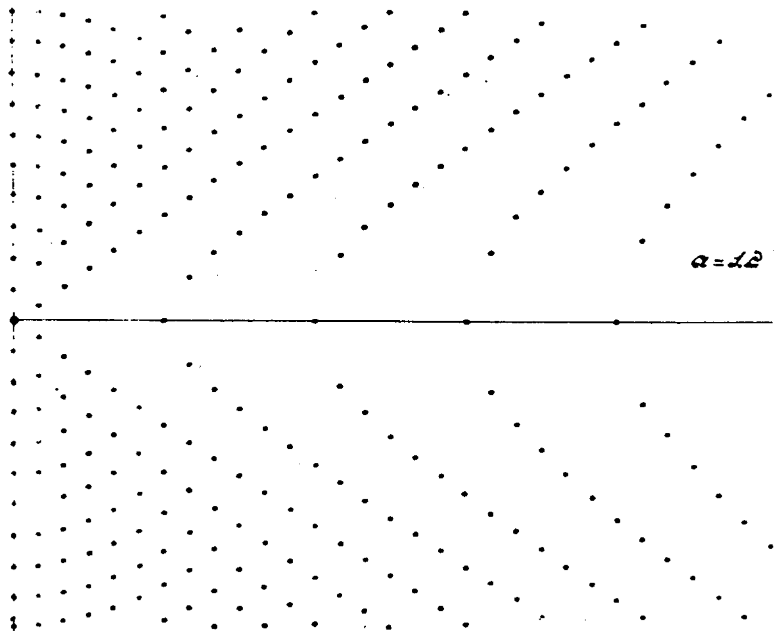
Figure 13:
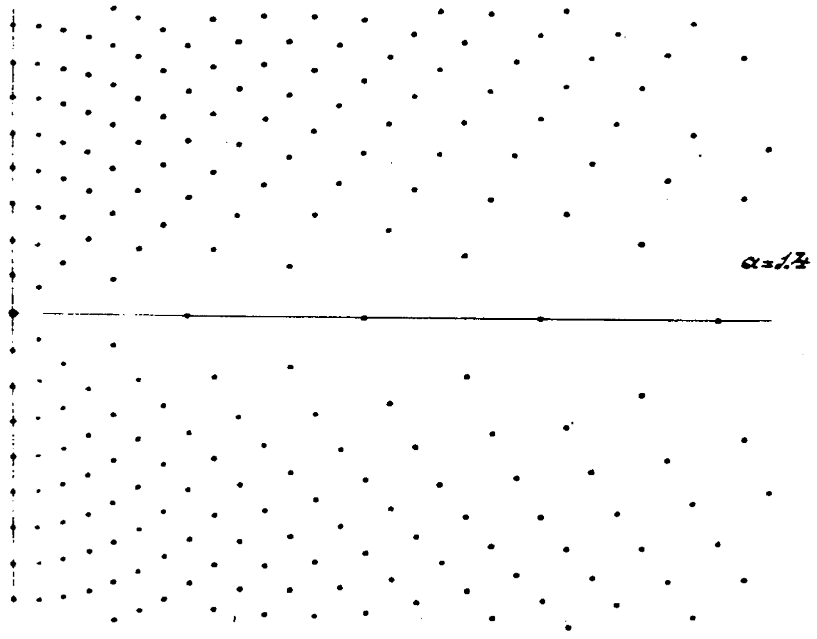
Figure 14:
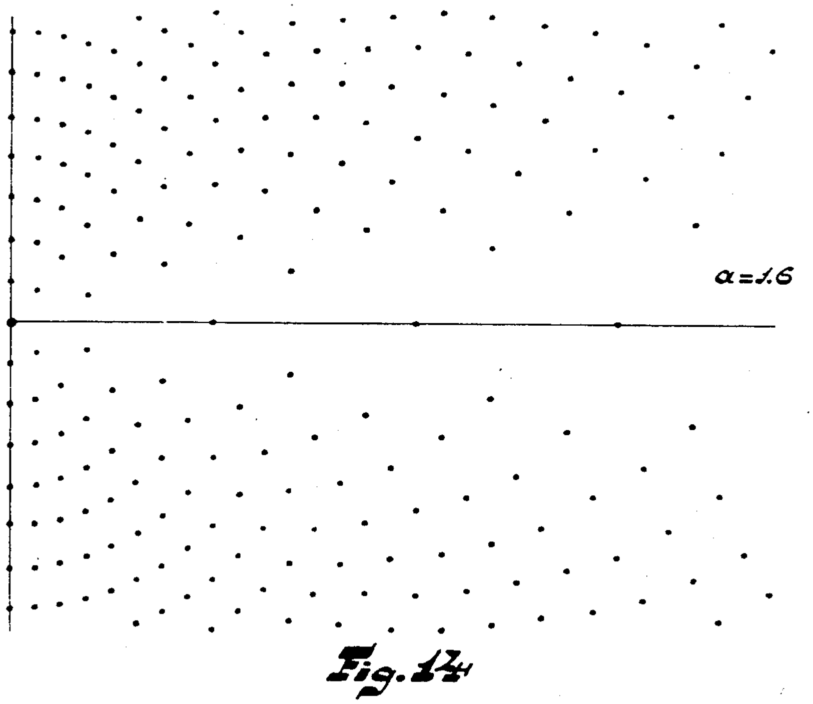

If $a$ is caused to decrease, the parabolas initially change into ellipses; this is evident from Figures 7 and 8, in which $a$ is chosen to be 0.9 and 0.8 respectively.

However, if $a$ is imagined to be 0.5 parabolas appear again (Fig. 11), since $a$ is the reciprocal value of 2. At values of $a$ slightly exceeding 0.5, for example $a=0.6$ (Fig. 10) hyperbolas appear. If $a=0.7$ (Fig. 9) both curve forms are observed.

Similarly, if $a$ is caused to increase from unity (Fig. 6) to the values 1.2 and 1.4, hyperbolas are formed (Figures 12 and 13 respectively), particularly in the first-mentioned case.

In the last-mentioned case ($a=1.4$) the hyperbolas lie comparatively close together, so that they may lie below the resolving power of the eye. If $a=1.6$ (Fig. 14) neither of the two curve forms is conspicuous. If $a=1.8$ (Fig. 15) ellipses appear and if $a=2$ (Fig. 16) parabolas are formed again.

It is pointed out once more that such fine initial circle and line rasters of a projection device may be assumed to be chosen as to be beyond the resolving power of the eye. The moiré figures will not be annoying if the ordination curves also are regularly and closely arranged together such that the spacing is beyond the resolving power of the eye. They will, however, be the more troublesome as the ordination curves are more spaced apart, which is particularly the case where the tangents of the circles extend substantially parallel with the lines of the line raster i. e. near the X-axis.

Figure 15:
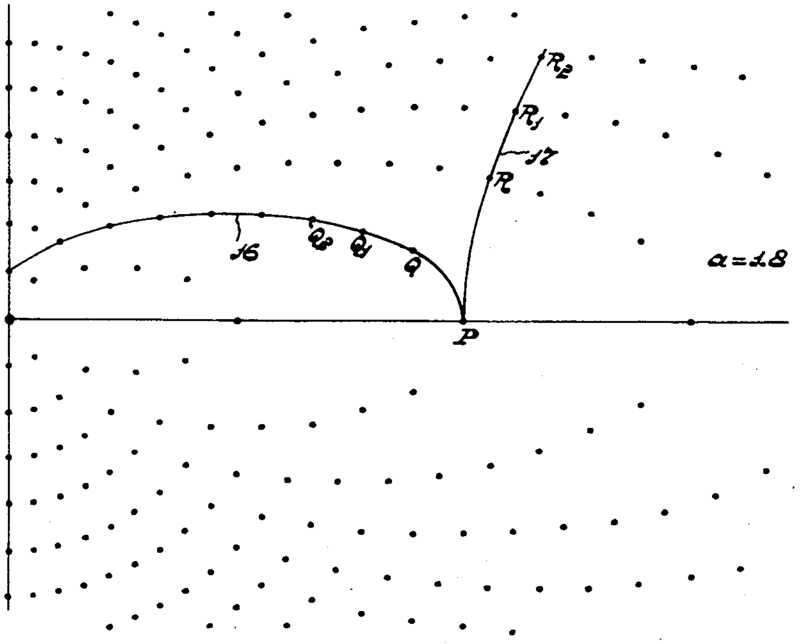
Figure 16:
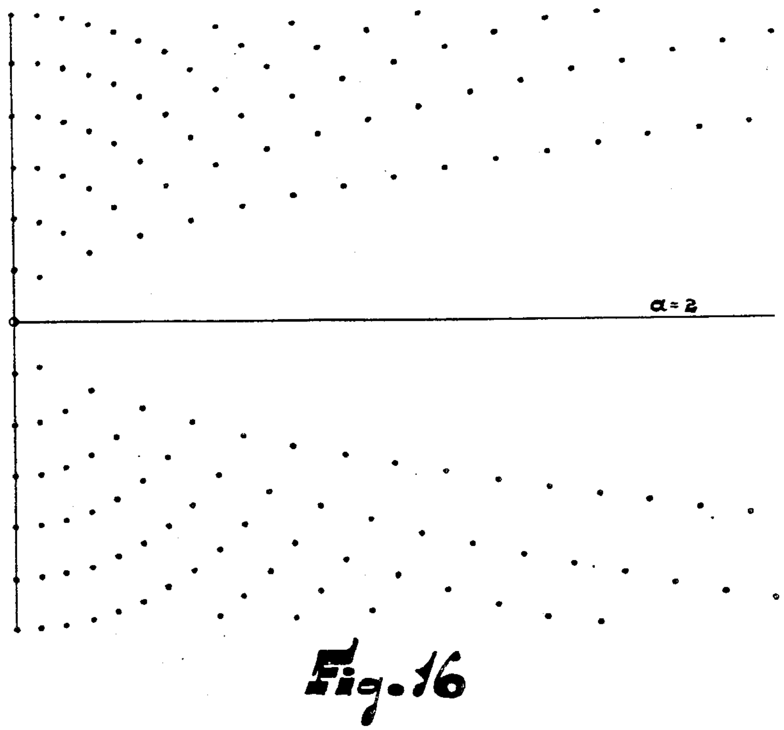

The values of $a$ at which the figures will not appear to an annoying degree may be calculated when considering that in this case the points of intersection on the elliptic ordination curves will approximately be equally spaced apart as those on the hyperbolic curves. This condition must particularly be fulfilled at points near the X-axis and remote from the starting point, since in this area the moiré figures are always most conspicuous. Fig. 15 shows an elliptic ordination curve 17 and a hyperbolic curve 18 having a point P on the X-axis in common. The adjacent points on the curves are denoted Q and R.

The optimum value of $a$ will now be that for which holds $PQ=PR$. It has furthermore been found by experiment what deviations from this value are possible in practice. The calculation is most simple if the case in which $a<1$ is treated separately from the case in which $a>1$.

Figures 17, 18:
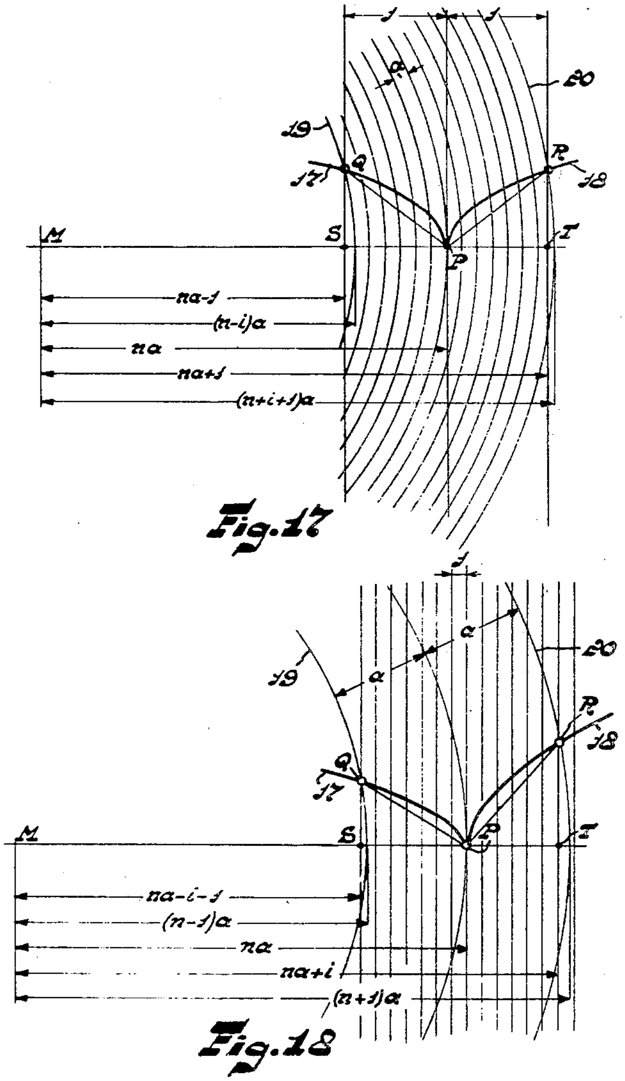
Figs. 17 and 18 are diagrams for explaining the calculations of the optimum values of the ratio $a$.

The first case is calculated with reference to Fig. 17, the second with reference to Fig. 18. The two figures show two ordination curves 17 and 18 which intersect the Y-axis at a point P. For the ratios $a$ arbitrary numbers are chosen and the coordinates of all points are expressed in the relative spacing of the straight lines, which is assumed to be unity, in the relative spacing of the circles which, per definition, is consequently equal to $a$ in a number $n$ which indicates how many times $a$ the point P is remote from the origin point and in a number $i$ which depends upon the value of $a$.

Several theoretically optimum values of $a$ will be found, which are designated $a_m$.

In the first-mentioned case in which $a<1$, the value $$\frac{1}{a}$$

has been chosen to lie between the values $i$ and $i+1$ where $i$ is a whole number ($i=1$, 2, 3 and so forth). In this event there are $i$ circle passages through the X-axis between that line of the line raster on which the point P lies and each of the two adjacent lines of this raster.

In the circle 19, on which lies the point Q and the radius of which is equal to $(n-i)a$ holds:

$$QS^2=(n-i)^2a^2-MS^2=(n-i)^2a^2-(na-1)^2$$
$$PQ^2=QS^2+SP^2=QS^2+1=i^2a^2-2nia^2+2na$$

Similarly, for the circle 20, on which lies the point R and the radius of which is equal to $(n+i+1)a$ it holds:

$$RT^2=(n+i+1)^2a^2-MT^2=(n+i+1)^2a^2-(na+1)^2$$
$$PR^2=RT^2+PT^2=RT^2+1=i^2a^2+a^2+2nia^2+2na^2+2ia^2-2na$$

For the optimum ratio consequently holds:

$$PQ=PR$$

and $$\frac{PR^2}{PQ^2}=\frac{i^2a^2+a^2+2nia^2+2na^2+2ia^2-2na}{i^2a^2-2nia^2+2na}=1 \quad (14)$$

As has already been said, the occurrence of the moiré figures is most critical at a great distance from the origin i. e. where $n$ approaches to $\infty$.

In this case (14), after dividing the numerator and the denominator by $n$, changes into $$\frac{PR^2}{PQ^2}=1\div\frac{(i+1)a-1}{1-ia} \quad (15)$$

whence follows the theoretically optimum ratio $a_m$, if $a<1$:

$$a_m=\frac{2}{2i+1} \text{ and } i=1, 2, 3 \text{ and so on} \quad (16)$$

hence $$a_m=\frac{2}{3}, \frac{2}{5}, \frac{2}{7} \text{ and so on}$$

If $a>1$, $a$ is chosen to be between the values $i$ and $i+1$, in which $i$ is again a whole number. Between the point P (Fig. 18) and the points of intersection of the adjacent circles 19 and 20 with the X-axis there are $i$ passages of straight lines of the line raster.

In the same manner as if $a<1$, it can now be derived:

$$QS^2=(n-1)^2a^2-(na-i-1)^2$$
$$PQ^2=QS^2+PS^2=QS^2+(i+1)^2=(n-1)^2a^2-(na-i-1)^2+(i+1)^2=a^2-2na^2+2nai+2na$$

and $$RT^2=(n+1)^2a^2-(na+i)^2$$
$$PR^2=RT^2+PT^2=RT^2+i^2(n+1)^2a^2-(na+i)^2+i^2=a^2+2na^2-2nai$$

hence $$\frac{PR^2}{PQ^2}=\frac{a^2+2na^2-2nai}{a^2-2na^2+2nai+2na}=1 \quad (17)$$

If $n$ is caused to approach to $\infty$ then (17) changes into $$\frac{PR^2}{PQ^2}=\frac{a-i}{i+1-a}=1 \quad (18)$$

From this follows the theoretically optimum ratio $a_m$ if $a>1$ $$a_m=\frac{2i+1}{2} \text{ and } i=1, 2, 3 \text{ and so on} \quad (19)$$

hence $$a_m=\frac{3}{2}, \frac{5}{2}, \frac{7}{2} \text{ and so on}$$

It will, however, be obvious that the moiré figures will not immediately occur upon slightly departing from these optimum values. It has been found by experiment that in the case of departing from the said ratios between the position of the points of intersection on the ellipses and hyperbolas the moiré figures are sufficiently avoided, if $$\frac{2}{3}<\frac{PR}{PQ}<\frac{3}{2} \quad (20)$$

Since, however, there is, as a rule, a great freedom in the choice of these ratios, the deviation is preferably chosen to be smaller and it is provided that $$\frac{3}{4}<\frac{PR}{PQ}<\frac{4}{3} \quad (21)$$

From the Equations 20 and 15 it follows $$\frac{4}{9}<\frac{(i+1)a-1}{1-ia}<\frac{9}{4} \quad (22)$$

hence the ratio $a$ may be chosen between the values:

$$a'=\frac{1.45}{1+1.45i} \text{ and } a''=\frac{3.25}{1+3.25i}$$

if $a<1$, whereas in a similar manner it can be derived from the Equations 20 and 18 that, if $a>1$, this ratio should lie between the values:

$$a'=\frac{1+3.25i}{3.25} \text{ and } a''=\frac{1+1.45i}{1.45}$$

The principal values of $a$ falling under this condition are stated in the following table:

| |
|---|
| 0.21–0.232 |
| 0.27–0.31 |
| 0.37–0.43 |
| 0.59–0.76 |
| 1.3 –1.7 |
| 2.3 –2.7 |
| 3.3 –3.7 |
| 4.3 –4.7 |

However, the ratio $a$ will preferably be chosen within the narrower limits stated under (21); if $a<1$ it can be derived from (21) and (15) in this event that $a$ must lie between $$a'=\frac{1.56}{1+1.56i} \text{ and } a''=\frac{2.8}{1+2.8i}$$

and, if $a>1$, between the limits $$a'=\frac{1+2.8i}{2.8} \text{ and } a''=\frac{1+1.56i}{1.56}$$

The values of $a$ following from this condition lie between the limits 0.215–0.226
0.28 –0.3
0.38 –0.42
0.61 –0.74
1.36 –1.64
2.36 –2.64
3.36 –3.64
4.36 –4.64

In Fig. 5 the ranges within which $a$ should lie in order to fulfil the Equation 20 are cross-hatched.

There is little point in choosing a definite value of $a$ at which $i$ exceeds 5, since in these cases the circle raster or the line raster will dominate, as appeared from the above considerations with reference to the Equations 12 and 13. The ordination curves occurring in these cases are discussed more in detail in patent application Serial No. 42,377 filed August 4, 1948.

If two or more rasters of equidistant straight lines coincide with a raster of equidistant circles, there will be for each of these rasters of straight lines a ratio $a_1$, $a_2$ and so forth. They may, but need not be equal. In this event each of these ratios will preferably be chosen between the aforesaid limit values.

The lines of rasters of equidistant straight lines will, as a rule, not be parallel. If there are two of them, the lines will generally be at right angles to each other, so that one yields a definite distribution of light in the vertical plane, the other a definite distribution of light in the horizontal plane.

The same may occur if two rasters of equidistant circles, which will naturally be concentrical, coincide with a raster of equidistant straight lines.

Figure 19:
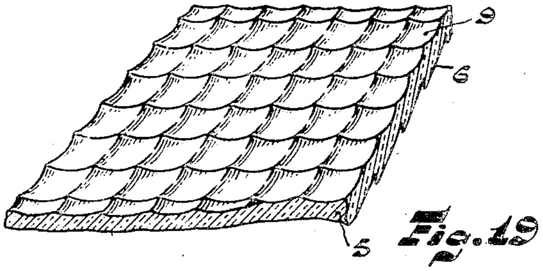
Fig. 19 is a perspective view of a screen according to the invention.

Fig. 19 shows diagrammatically part of a screen provided with two rasters of parallel lines at right angles to one another. These two rasters are capable of forming into a beam the light to be diffused by such a screen, as is known per se and described, for example, in Hausmitteilungen aus Forschung und Betrieb der Fernseh A. G. of Berlin (1939), vol. 3 April, page 78, Fig. 13. At the other side of the screen ribs are provided in the form of an Archimedean spiral, which form a Fresnel lens. If, for instance, the relative spacing of these substantially circular grooves $s$ is 0.5 mm., the relative spacing of the straight lines of the two crossed rasters may, as appears from Fig. 5 and the tables, be chosen to be ¾ mm. and ⅓ mm. respectively.

If it is the lines of the television image itself which give rise to the appearance of moiré figures due to coincidence of this image with a Fresnel surface, a suitable spacing of the circles (or of the turns of the spiral) may be chosen in the same manner from Fig. 5 or from the table.

What I claim is:

1. A projection screen comprising a raster of equidistant straight grooves on one side thereof, each of said grooves having the same concave cross-section and each being spaced at a first predetermined distance with respect to adjacent grooves and a raster of equidistant circularly disposed grooves on the other side thereof forming a Fresnel surface and spaced at a second predetermined distance, whereby areas of said raster of straight grooves optically coinciding with points of said raster of circularly disposed grooves, the ratio $a$ between the relative values of said predetermined distances of said circular grooves and said straight grooves thus formed lying between the values $$a'=\frac{1.45}{1+1.45i} \quad \text{and} \quad a''=\frac{3.25}{1+3.25i}$$

if $a$ is smaller than unity, and between the values $$a'=\frac{1+3.25i}{3.25} \quad \text{and} \quad a''=\frac{1+1.45i}{1.45}$$

if $a$ exceeds unity, $i$ being a whole number.

2. A projection screen comprising a raster of equidistant straight grooves on one side thereof, each of said grooves having the same concave cross-section and each being spaced at a first predetermined distance with respect to adjacent grooves and a raster of equidistant circularly disposed grooves on the other side thereof forming a Fresnel surface and spaced at a second predetermined distance, whereby areas of said raster of straight grooves optically coinciding with points of said raster of circularly disposed grooves, the ratio $a$ between the relative values of said predetermined distances of said circular grooves and said straight grooves thus formed lying between the values $$a'=\frac{1.56}{1+1.56i} \quad \text{and} \quad a''=\frac{2.8}{1+2.8i}$$

if $a$ is smaller than unity, and between the values $$a'=\frac{1+2.8i}{2.8} \quad \text{and} \quad a''=\frac{1+1.56i}{1.56}$$

if $a$ exceeds unity $i$ being a whole number.

GERRIT JAN SIEZEN.

REFERENCES CITED

The following references are of record in the file of this patent:

UNITED STATES PATENTS

| Number | Name | Date |
|---|---|---|
| 1,943,995 | Weld | Jan. 16, 1934 |
| 1,970,358 | Bull et al. | Aug. 14, 1934 |
| 2,258,164 | Genies | Oct. 7, 1941 |

FOREIGN PATENTS

| Number | Country | Date |
|---|---|---|
| 831,451 | France | June 7, 1938 |